United States Patent
Korchemny (10) Patent No.: US 11,232,174 B1
(45) Date of Patent: Jan. 25, 2022

(54) SAT SOLVER BASED ON INTERPRETATION AND TRUTH TABLE ANALYSIS

(71) Applicant: Synopsys, Inc., Mountain View, CA (US)

(72) Inventor: Dmitry Korchemny, Kfar Saba (IL)

(73) Assignee: Synopsys, Inc., Mountain View, CA (US)

( * ) Notice: Subject to any disclaimer, the term of this patent is extended or adjusted under 35 U.S.C. 154(b) by 114 days.

(21) Appl. No.: 16/568,797

(22) Filed: Sep. 12, 2019

Related U.S. Application Data (60) Provisional application No. 62/733,716, filed on Sep. 20, 2018.

(51) Int. Cl.
G06F 17/11 (2006.01)
G06F 7/48 (2006.01)
G06F 17/16 (2006.01)

(52) U.S. Cl.
CPC .......... *G06F 17/11* (2013.01); *G06F 7/4824* (2013.01); *G06F 17/16* (2013.01)

(58) Field of Classification Search
CPC .......... G06F 17/11; G06F 17/16; G06F 7/4824
See application file for complete search history.

(56) References Cited

U.S. PATENT DOCUMENTS

| | | | | |
|---|---|---|---|---|
| 6,415,430 B1* | 7/2002 | Ashar | ...................... | G06F 30/34 716/105 |
| 6,912,700 B1* | 6/2005 | Franco | ................. | G06F 30/3323 716/103 |
| 7,356,519 B1* | 4/2008 | Goldberg | ............... | G06N 5/003 706/45 |
| 2002/0178424 A1* | 11/2002 | Gupta | ................. | G06F 30/3323 716/106 |

\* cited by examiner

*Primary Examiner* — Michael D. Yaary
(74) *Attorney, Agent, or Firm* — Park, Vaughan, Fleming & Dowler LLP; Laxman Sahasrabuddhe (57) ABSTRACT

Techniques and systems for solving Boolean satisfiability (SAT) problems are described. Some embodiments solve SAT problems using efficient construction of truth tables. Some embodiments can improve performance of SAT solvers by using truth tables instead of incurring the overhead of Conjunctive Normal Form (CNF) conversion.

10 Claims, 8 Drawing Sheets

|   |   |   |   |   |   |   |   |   |   |   |   |   |   |   |   |
|---|---|---|---|---|---|---|---|---|---|---|---|---|---|---|---|
| a | 0 | 1 | 0 | 1 | 0 | 1 | 0 | 1 | 0 | 1 | 0 | 1 | 0 | 1 | 0 | 1 |
| b | 0 | 0 | 1 | 1 | 0 | 0 | 1 | 1 | 0 | 0 | 1 | 1 | 0 | 0 | 1 | 1 |
| c | 0 | 0 | 0 | 0 | 1 | 1 | 1 | 1 | 0 | 0 | 0 | 0 | 1 | 1 | 1 | 1 |
| d | 0 | 0 | 0 | 0 | 0 | 0 | 0 | 0 | 1 | 1 | 1 | 1 | 1 | 1 | 1 | 1 |

FIG. 1A

|   |   |   |   |   |   |   |   |   |   |   |   |   |   |   |   |   |
|---|---|---|---|---|---|---|---|---|---|---|---|---|---|---|---|---|
| a | 0 | 1 | 0 | 1 | 0 | 1 | 0 | 1 | 0 | 1 | 0 | 1 | 0 | 1 | 0 | 1 |
| b | 0 | 0 | 1 | 1 | 0 | 0 | 1 | 1 | 0 | 0 | 1 | 1 | 0 | 0 | 1 | 1 |
| c | 0 | 0 | 0 | 0 | 1 | 1 | 1 | 1 | 0 | 0 | 0 | 0 | 1 | 1 | 1 | 1 |
| d | 0 | 0 | 0 | 0 | 0 | 0 | 0 | 0 | 1 | 1 | 1 | 1 | 1 | 1 | 1 | 1 |
| f | 1 | 1 | 1 | 0 | 0 | 0 | 1 | 1 | 0 | 0 | 0 | 0 | 1 | 0 | 1 | 1 |

FIG. 1B

```
bool satF() {
    static const UINT X1 = 0x555...5;
    static const UINT X2 = 0x333...3;
    ...
    static const UINT Xm = 0x00...FF;

static const UINT zeros = 0;
    static const UINT ones = ~0;

UINT x[n-m];

for (int ctr = (1 << (n - m)) - 1; ctr >= 0; --ctr) {
        for (int i = 0; i < n - m; i++) {
            x[i] = (ctr >> i) & 1U ? ones : zeros;
        }
        if (f(X1, ..., Xm, x)) return true;
    }
    return false;
}
```

```
class Variable {
public:
    void assignValue(bool val);
    bool hasValue();
    bool getValue();
    bool setValue(bool val);
    void reportConflict();
    void propagateValue();
    virtual bool isTruthTable() { return false; }
} class TruthTable : public Variable {
public:
    virtual bool isTruthTable () { return true; }
    bool inferValues();
    void compute(UINT x, int i, bool val);
    UINT tt;
}
```

FIG. 3A

```
void Variable::assignValue(bool val)  {
    if (hasValue() {
        if (val != getValue()) reportConfict();
        return;
    } setValue(val);
    if (isTruthTable()) inferValues();
    propagateValue();
} void TruthTable::inferValues() {
    if (!hasValue()) return;
    if (getValue() == 0) {
        FOREACH_TRUTH_TABLE_VARIABLE(x) {
            if ((~tt & x) == 0) var(x).assignValue(0);
            else if ((~tt & ~x) == 0) var(x).assignValue(1);
        }
    } else {
        FOREACH_TRUTH_TABLE_VARIABLE(x) {
            if ((tt & x) == 0) var(x).assignValue(0);
            else if ((tt & ~x) == 0) var(x).assignValue(1);
        }
    }
}
```

- 302: first if-block in assignValue
- 304: setValue and propagate block
- 306: getValue()==0 branch
- 308: else branch

FIG. 3B

| tt | 0 | 0 | 0 | 0 | 0 | 0 | 1 | 1 | 0 | 0 | 0 | 0 | 1 | 0 | 1 | 1 |
|---|---|---|---|---|---|---|---|---|---|---|---|---|---|---|---|---|
| x1 | 0 | 1 | 0 | 1 | 0 | 1 | 0 | 1 | 0 | 1 | 0 | 1 | 0 | 1 | 0 | 1 |
| x2 | 0 | 0 | 1 | 1 | 0 | 0 | 1 | 1 | 0 | 0 | 1 | 1 | 0 | 0 | 1 | 1 |
| x3 | 0 | 0 | 0 | 0 | 1 | 1 | 1 | 1 | 0 | 0 | 0 | 0 | 1 | 1 | 1 | 1 |
| x4 | 0 | 0 | 0 | 0 | 0 | 0 | 0 | 0 | 1 | 1 | 1 | 1 | 1 | 1 | 1 | 1 |

FIG. 3C

```
      void Variable:: propagateValue () {
320 → if (!hasValue()) return;
         ┌  FOREACH_TRUTH_TABLE_DEPENDING_ON_THIS_VARIABLE(t) {
322 ┤         t.compute();
         └  }
      } void TruthTable::compute() {
         if (hasValue()) return;
         UINT mask = 0;
         ┌ FOREACH_TRUTH_TABLE_VARIABLE(x) {
324 ┤        if (!var(x).hasValue()) continue;
         └    mask |= var(x).getValue() ? x : ~x;
         }
326 ┤ ┌ if ((tt & mask) == 0) assignValue(0);
      └ else if ((~tt & mask) == 0) assignValue(1);
      }
```

SAT SOLVER BASED ON INTERPRETATION AND TRUTH TABLE ANALYSIS

RELATED APPLICATION

This application claims benefit of U.S. Provisional Application Ser. No. 62/733,716, filed on 20 Sep. 2018, the contents of which are herein incorporated by reference in their entirety for all purposes.

COPYRIGHT NOTICE

The assignee of this patent document does not object to the facsimile reproduction of the patent document as it appears in the files of the United States Patent and Trademark Office, but otherwise reserves all rights whatsoever in any included works of authorship protected by copyright.

BACKGROUND

Technical Field

This disclosure relates to solving Boolean satisfiability (SAT) problems. More specifically, this disclosure relates to SAT solvers based on interpretation and truth table analysis.

Related Art

Given a Boolean formula F that is defined over one or more Boolean variables $x_1$, $x_2$, and $x_n$, the SAT problem is to determine whether or not an assignment of TRUE/FALSE values to the Boolean variables exists that causes the Boolean formula F to evaluate to TRUE.

A SAT solver is a software application or module that solves SAT problems. SAT solvers have numerous applications, e.g., see Jodo P. Marques-Silva, "Practical applications of Boolean satisfiability," Proceedings of the 9th International Workshop on Discrete Event Systems, 2008. Specifically, SAT solvers are commonly used in an integrated circuit (IC) design flow, including, but not limited to, combinational equivalence checking, automatic test-pattern generation, model checking, and routing. Other applications include planning in artificial intelligence, and haplotyping in bioinformatics. In general, any technological problem that can be modeled as a SAT problem can be solved by using a SAT solver. A SAT problem is said to have been solved when a SAT solver either (1) finds a variable assignment that satisfies the formula, or (2) proves that the SAT problem is unsatisfiable.

The "P versus NP problem" is one of the most important unsolved problems in computer science, and SAT is a well-known NP-complete problem. No worst-case polynomial time algorithm is known to exist for any NP-complete problem. Therefore, what are needed are techniques and systems for improving performance of SAT solvers.

SUMMARY

This section is not intended to limit the scope of the disclosed subject matter. The disclosed subject matter is to be accorded the widest scope consistent with the principles and features disclosed in the entire disclosure. Some embodiments described herein provide systems and techniques to solve SAT problems using efficient construction of truth tables. For some SAT problems, the truth tables constructed by embodiments described herein can be used to reduce the overhead introduced by Conjunctive Normal Form (CNF) conversion in conventional SAT solvers, and the performance and capacity of SAT solvers implemented in hardware, such as Field Programmable Gate Array (FPGA) based SAT solvers, can also be improved.

Some embodiments can receive a Boolean formula defined over a set of variables. Next, the embodiments can determine a hierarchy of Boolean formulas based on the Boolean formula by recursively rewriting the Boolean formula as another Boolean formula that is defined over a subset of variables and a set of new variables, wherein each new variable represents a respective Boolean formula. The process can then represent each new variable by a truth table. Next, the process can determine if the Boolean formula is satisfiable by iteratively performing a set of operations, comprising: (1) assigning a value to a variable or a truth table, (2) inferring values of variables when a truth table is assigned a value, (3) restricting other truth tables that depend on a variable that is assigned a value, and (4) detecting a conflict if inconsistent values are attempted to be assigned to a variable.

In some embodiments, the Boolean formula is determined to be satisfiable if while iteratively performing the set of operations, the embodiment is able to assign values to all variables without conflict that causes the Boolean formula to evaluate to a TRUE value.

In some embodiments, the Boolean formula is determined to be unsatisfiable if the set of operations that are performed iteratively terminates, and the embodiment is unable to assign values to all variables without conflict that causes the Boolean formula to evaluate to a TRUE value.

Some embodiments determine if a Boolean formula is satisfiable by using a processor that natively performs Boolean operations on m-bit variables, wherein the Boolean formula is defined over n variables, and wherein n is greater than m. Specifically, the embodiments can define m-bit constants corresponding to distinct m-bit patterns. Next, the embodiments can iteratively perform a set of operations, comprising: selecting a distinct (n-m)-bit pattern; assigning values to variables by combining the m-bit constants with the distinct (n-m)-bit pattern; evaluating the Boolean formula by using the values assigned to the variables; and in response to determining that the Boolean formula evaluated to a TRUE value, determining that the Boolean formula is satisfiable.

In some embodiments, the Boolean formula is determined to be unsatisfiable if the Boolean formula did not evaluate to a TRUE value in any iteration during said iteratively performing the set of operations. In some embodiments, said iteratively performing the set of operations terminates when all possible (n-m)-bit patterns have been selected. In some embodiments, said assigning values to variables by combining the m-bit constants with the distinct (n-m)-bit pattern comprises concatenating each m-bit constant with the distinct (n-m)-bit pattern.

DETAILED DESCRIPTION

The following description is presented to enable any person skilled in the art to make and use the claimed invention(s), and is provided in the context of particular application(s) and/or environment(s). Various modifications to the disclosed embodiments will be readily apparent to those skilled in the art, and the general principles defined herein may be applied to other embodiments and applications without departing from the spirit and scope of the disclosure. Thus, the disclosed subject matter is not limited to the embodiments shown, but is to be accorded the widest scope consistent with the principles and features disclosed herein.

In this disclosure, numerous specific details may be described to enable one or more of the embodiments. In the interest of not obscuring the presentation of the embodiments, some features that are known in the art may be combined together, may be described in less detail, or may be implied (i.e., some well-known features may not be explicitly described). Furthermore, while this description may refer to some features in the singular tense, more than one instance of the feature may be illustrated in the figures, and like components are labeled with like numerals.

Many areas of computer science and electronic design automation (EDA) require solving instances of the SAT problem. As mentioned earlier, the SAT problem is known to be NP-complete, and thus, all existing solvers have worst-case exponential complexity. Existing SAT solvers are able to deal with Boolean formulas having tens of thousands of variables and millions of terms. Major effort is dedicated to solving large and difficult problems.

In practice there is also a need to solve a large number of small SAT problems, say, containing up to 20 variables. Such problems arise, for example, in formal equivalence checking, static timing analysis, design rule checking, etc. Some instances of SAT problems in these applications may be hard, but most of them are small. Even if solving one small instance of a SAT problem using existing technologies is easy and fast, solving millions of such instances imposes a heavy burden even if several SAT problems are solved in parallel. The need in the fast solving becomes especially acute if the SAT problem applications are part of some compilation flow, e.g., part of a hardware emulation model compilation process.

Existing SAT solvers include a large computational overhead because they build a CNF representation of the logic formula, perform constant propagation, build complex data structures, etc. Further details of the various sources of computational overhead can be found in C. P. Gomes, H. Kautz, A. Sabharwal and B. Selman, "Satisfiability Solvers," in *Handbook of Knowledge Representation*, San Diego, USA, Elsevier Science, 2007, pp. 89-134. This overhead becomes the most time-consuming part when solving small SAT problems.

For small SAT problems, one can use Binary Decision Diagrams (BDD)—see e.g., E. M. Clarke, O. Grumberg and D. Peled, "Model Checking," Cambridge, Mass., USA: MIT Press, 1999. However, BDD managers contain complicated data structures—lists, trees, hash tables, and when a large number of BDDs are accumulated, they may blow up or hang because of the garbage collection and variable sifting. Therefore, one needs to recreate or clean the data structures from time to time, which is also time consuming.

Additionally, the SAT problems that typically occur in EDA applications are such that their conversion into CNF results in the introduction of many additional variables and clauses. This imposes a significant overhead in the case of big SAT problems and breaks the direct link between the Boolean network for which the SAT problem is desired to be solved and the corresponding SAT problem. Finally, CNF representation is not friendly for hardware SAT solver implementation either, and therefore affects capacity and performance of the SAT solver implementation in hardware.

Consider the task of determining whether a Boolean function $f(x_1, \ldots, x_n)$ of n Boolean arguments can assume the value 1, and if it can, provide at least one Boolean assignment of its arguments setting the function value to 1. To take a specific example, consider the Boolean function $f$=a & b|c. This function is satisfiable because, when a=1, b=0, and c=1, the value of $f$ is equal to 1. On the other hand, the function g=a &~(a|b) is unsatisfiable because g=0 regardless of the values that are assigned to a and b. In the previous sentence, $f$ and g are described using a syntax similar to that of C or C++; this syntax is used for describing Boolean expressions and functions throughout this document. The "&" symbol corresponds to the logical AND operation, the "|" symbol corresponds to the logical OR operation, and the "^" symbol corresponds to the logical exclusive-OR, i.e., XOR, operation.

Some conventional SAT solvers first convert a given Boolean function into a CNF representation, and then try to guess/infer the values of its arguments to satisfy this function. For example, a conventional SAT solver may create the following CNF for Boolean formula $f$=(a|b) & c by introducing two intermediate variables, d and e, and then try to use the CNF to solve the original SAT problem:

(~c|~d|e) & (d|~e) & (c|~e) & (a|b|~d) & (~a|d) & (~b|d).

In the above example, it is clear that the CNF representation is exceedingly verbose, and that it loses the original logical relationship between variables a, b and c.

Some embodiments described herein provide techniques and systems quickly solve small-sized SAT problems. As a result, the overhead introduced by the CNF conversion in conventional SAT solvers is reduced or eliminated, and the performance and capacity of SAT solvers implemented in hardware, such as FPGA SAT solvers is improved.

Specifically, embodiments described herein can include the following features and advantages: (1) building of truth tables for Boolean formulas using Boolean vector interpretation, (2) using truth tables built using Boolean vector interpretation for direct SAT solving of small size Boolean formulas (this allows for fast solving of many small-sized SAT problems given by Boolean formulas), (3) building software SAT solvers on top of truth tables for subformulas of the Boolean formula to be solved, and (4) building of hardware SAT solvers on top of truth tables for subformulas of the Boolean formula to be solved.

Figure 1A:
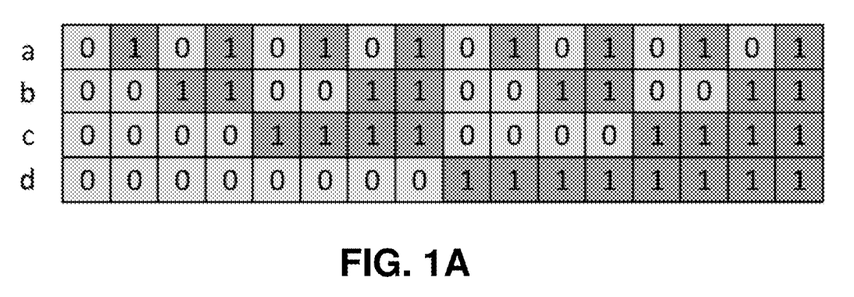
FIGS. 1A-1B illustrate an exhaustive interpretation of a Boolean function of a small number of variables, defined as a superposition of bitwise unary and binary Boolean operators resulting in a building of the truth table for this function in accordance with some embodiments described herein.
Figure 1B:
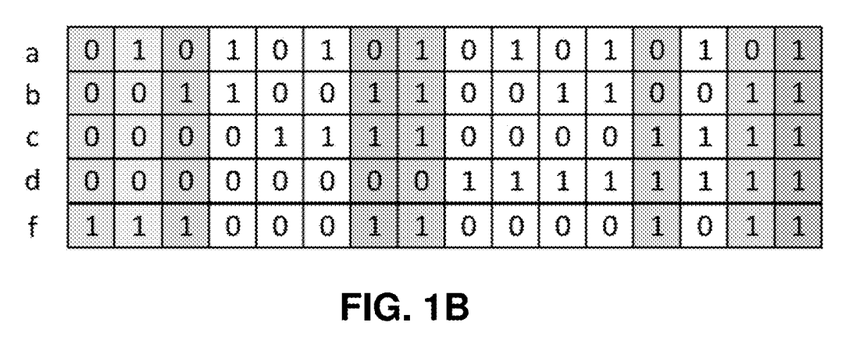

FIGS. 1A-1B illustrate an exhaustive interpretation of a Boolean function of a small number of variables, defined as a superposition of bitwise unary and binary Boolean operators resulting in a building of the truth table for this function in accordance with some embodiments described herein. Specifically, in reference to FIG. 1A, consider the following Boolean function: $f=(a \& (b^\wedge c)|(d \&\sim c))^\wedge \sim(\sim a \&\sim b \& c \&\sim d)$. To exhaustively solve the SAT problem, one has to examine all $2^4=16$ combinations of possible values 0 and 1 for a, b, c, d. It can be done, of course, in a loop, but it can be done more efficiently in parallel by encoding all 16 combinations using short words (16 bits) as shown in FIG. 1A.

In other words, this specific SAT problem is solved by the following C++ code shard:

```
#include <cstdint>
bool satF( ) {
    static const uint_16t a=0x5555;
    static const uint_16t b=0x3333;
    static const uint_16t c=0x0F0F;
    static const uint_16t d=0x00FF;
    return (a & (b^c)|(d &~c))^~(~a &~b & c &~d);}
```

If the returned value is zero, then the Boolean function is unsatisfiable. If the return value is not zero, then there exist assignments to the variables that causes the Boolean expression to evaluate to 1. To get all satisfying assignments, one could take the corresponding bits of a, b, c and d for the bits off that are equal to 1, as shown in FIG. 1B. From FIG. 1B, it can be seen that the satisfying assignments for (a, b, c, d) are as follows: {(1, 1, 1, 1), (0, 1, 1, 1), (0, 0, 1, 1), (1, 1, 1, 0), (0, 1, 1, 0), (0, 1, 0, 0), (1, 0, 0, 0), (0, 0, 0, 0)}.

Boolean Interpretation

In this disclosure, the term "Boolean interpretation" or "interpretation-based SAT (ISAT) platform" or ISAT for short, refers to an ordered set of variables $x_1, \ldots, x_n$, and a set of Boolean vectors of size $2^n$ corresponding to variables $x^i$, which is given by $x_i=(0^i 1^i)^{2^{n-i}}$, where in the right-hand side the power is to be interpreted as a repetition and the multiplication as a concatenation of Boolean vectors, e.g., $(0^2 1^2)^4=0011001100110011$. This interpretation-based SAT approach may be applied to any Boolean function whose support (the term "support" refers to the set of argument variables) belongs to the same ISAT platform. For the sake of readability, in this section, the notation $f(x_1, \ldots, x_n)$ will be used for the Boolean function, but it should be clear that the in the general case the variables $x_1, \ldots, x_n$ may actually appear in a different order.

In some embodiments, a linear program is built by the Boolean formula. The linear program is a sequence of assignment statements, e.g.:

$t_1 = \ldots$
$t_2 = \ldots$
$\ldots$
$t_{m-1} = \ldots$
$f = t_m = \ldots$ wherein each statement is of the form:

$t_i = \sim v$ or $t_i = v * w$ where the symbol "*" is any binary Boolean function, and v and w are either the variables $x_1, \ldots, x_n$ or the variables $t_1, \ldots, t_{m-1}$. In practice, some Boolean operators with the number of arguments greater than 2 are also acceptable if the processor is able to natively evaluate the Boolean operator.

In some embodiments, common subexpression elimination can be performed on the linear program. Further details on common subexpression elimination can be found in S. Muchnick, *Advanced Compiler Design and Implementation*, Morgan Kaufmann, 1997. Note that it is possible to interpret (i.e., perform) this program bitwise on vectors $x_1, \ldots, x_n$, so that $f$ is a Boolean vector which encodes the Boolean function's truth table. If $f=0$ (i.e., it is a vector with all its components 0), then the formula is unsatisfiable. Otherwise, it is satisfiable. The satisfying assignments correspond to the vector components $j_1, \ldots, j_k$ where $f$ has bits set to 1: $f[j_1]=f[j_2]=\ldots f[j_k]=1$, and $f[s]=0$ for $\notin\{j_1, \ldots, j_k\}$. These assignments are tuples $(x_i[j_m], i=1, \ldots n)$, where $m=1, \ldots, k$.

Boolean interpretation represents an exhaustive search and may be efficiently implemented for a relatively small number of variables. Specifically, for n<7, the interpretation maps to conventional machine arithmetic, so that each statement may be mapped into a single machine instruction. For example, when n=6, a $2^6$=64-bit arithmetic can be used. Many processors support vector instructions, which can handle longer operands. For example, Intel® AVX instructions can support 512-bit integers, which corresponds to n=9. Note that sometimes multiple operators may be executed by a single machine instruction, such as computing NAND and NOR, and even some ternary logic operators may be supported (e.g., instruction VPTERNLOGQ). A dedicated hardware, such as DSP processors, may handle even larger integers.

For a larger number of arguments, it is possible either to programmatically support larger bit vectors or to perform several iterations on smaller bit vectors.

Big Boolean vectors can be implemented using several smaller vectors. For example, to interpret Boolean functions of 10 arguments, it is possible to perform unary and binary Boolean operators on two 512-bit vectors, instead of one 1024-bit vector. Specifically, bitwise AND on two 1024-bit vectors is equivalent to two bitwise AND operators on two 512-bit vectors each. Using big Boolean vectors may be efficient for a reasonable number of Boolean arguments, say up to 12-13. In particular, ready-to-use software libraries exist that can work with big Boolean vectors, see e.g., the C++ Boost.Integer library described in B. Dawes, D. Walker, G. Prota and J. Maddock, "Boost.Integer," which is available online.

Another approach (that can be used on its own or together with the above-mentioned big Boolean approach) uses iteration to handle larger vectors. Specifically, if big Boolean vectors up to m bit long are supported, and it is desired to handle Boolean functions of n arguments where n>m, it is possible to perform the interpretation at most $2^{n-m}$ times until a satisfying assignment is found or all possible combinations are exhausted.

Figure 2A:
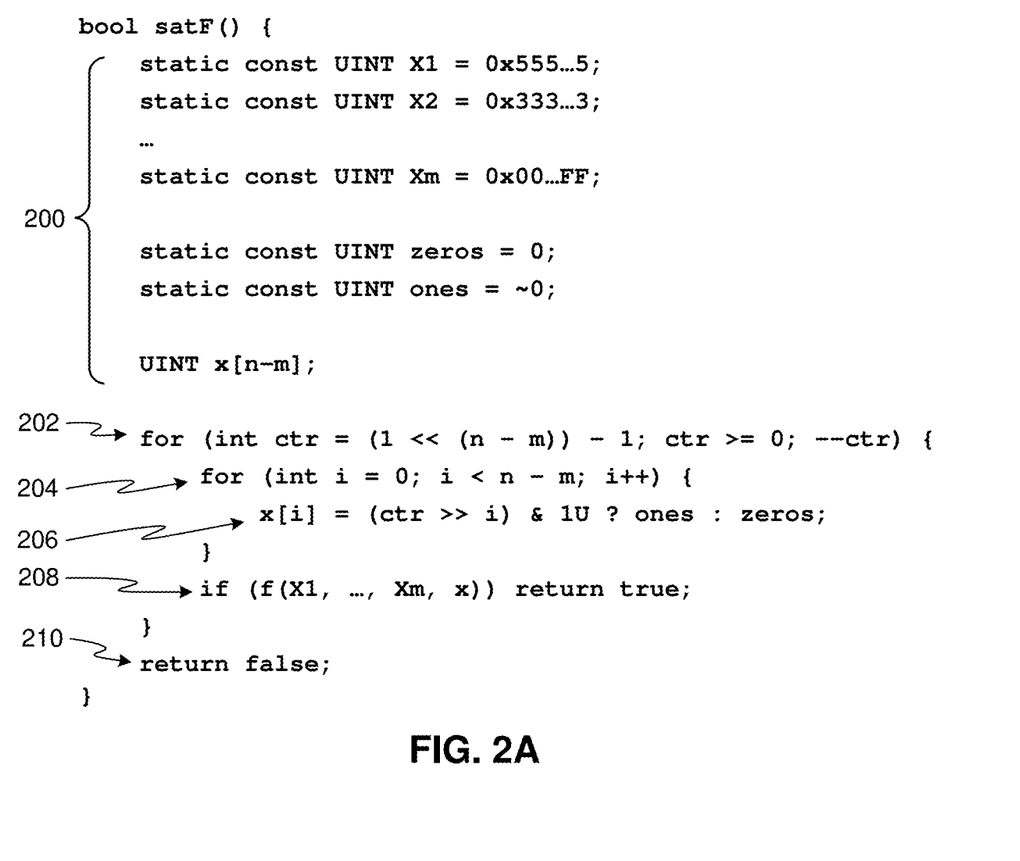
FIG. 2A illustrates a process for handing larger vectors by using an iterative approach in accordance with some embodiments described herein.

FIG. 2A illustrates a process for handing larger vectors by using an iterative approach in accordance with some embodiments described herein. In FIG. 2A, the process is described by using pseudocode with C++ syntax. In lines 200, UINT is the unsigned integer type of the largest Boolean vectors supported by the hardware or programmatically. For example, UINT may designate unsigned 512-bit integers. The symbols "n" and "m" refer to constants in FIG. 2A. The symbol "n" represents the number of variables in the Boolean formula, and the symbol "m" represents the word size for which Boolean operations can be performed by the underlying hardware. Lines 200 define and initialize various variables that are used in the rest of the pseudocode.

The patterns for $x_1, \ldots, x_n$ are partitioned into chunks of $2^m$ bits. The patterns for $x_1, \ldots, x_m$ recur in each chunk, and thus they are constants. On the other hand, the chunks of patterns for $x_{m+1}, \ldots, x_n$ change. Specifically, the pattern for $x_{m+1}$ changes from binary 1 . . . 1 to 0 . . . 0 each iteration, the pattern for $x_{m+2}$ changes each two iterations, etc. Lines 202 and 204 implement the iterative process, and line 206 gathers the patterns into array x, which is an (n–m) bit array.

For every combination of patterns, the Boolean function $f(x_1, \ldots, x_n)$ is interpreted in line 208. If the Boolean function evaluate to a TRUE value for the current pattern, then line 208 returns with a TRUE value. On the other hand, if none of the patterns evaluate to a TRUE value, then line 210 returns with a FALSE value. Note that, in FIG. 2A, the values of $x_{m+1}, \ldots, x_n$ are represented as array x. If the result is non-zero, then the formula $f$ is satisfiable for the given values of $x_{m+1}, \ldots, x_n$ (the value of these variables is 0 or 1 depending on their pattern chunk bits—all 0 or all 1). The corresponding values of $x_1, \ldots, x_m$ may be calculated using masking as explained above.

Since the execution of the outer loop body is very fast, it is feasible to execute the outer loop $2^{n-m}=2^{10}=1024$ times or even for greater values of n-m. Thus, the extended Boolean interpretation-based SAT works fast enough for Boolean functions with about 20 variables at least.

Figure 2B:
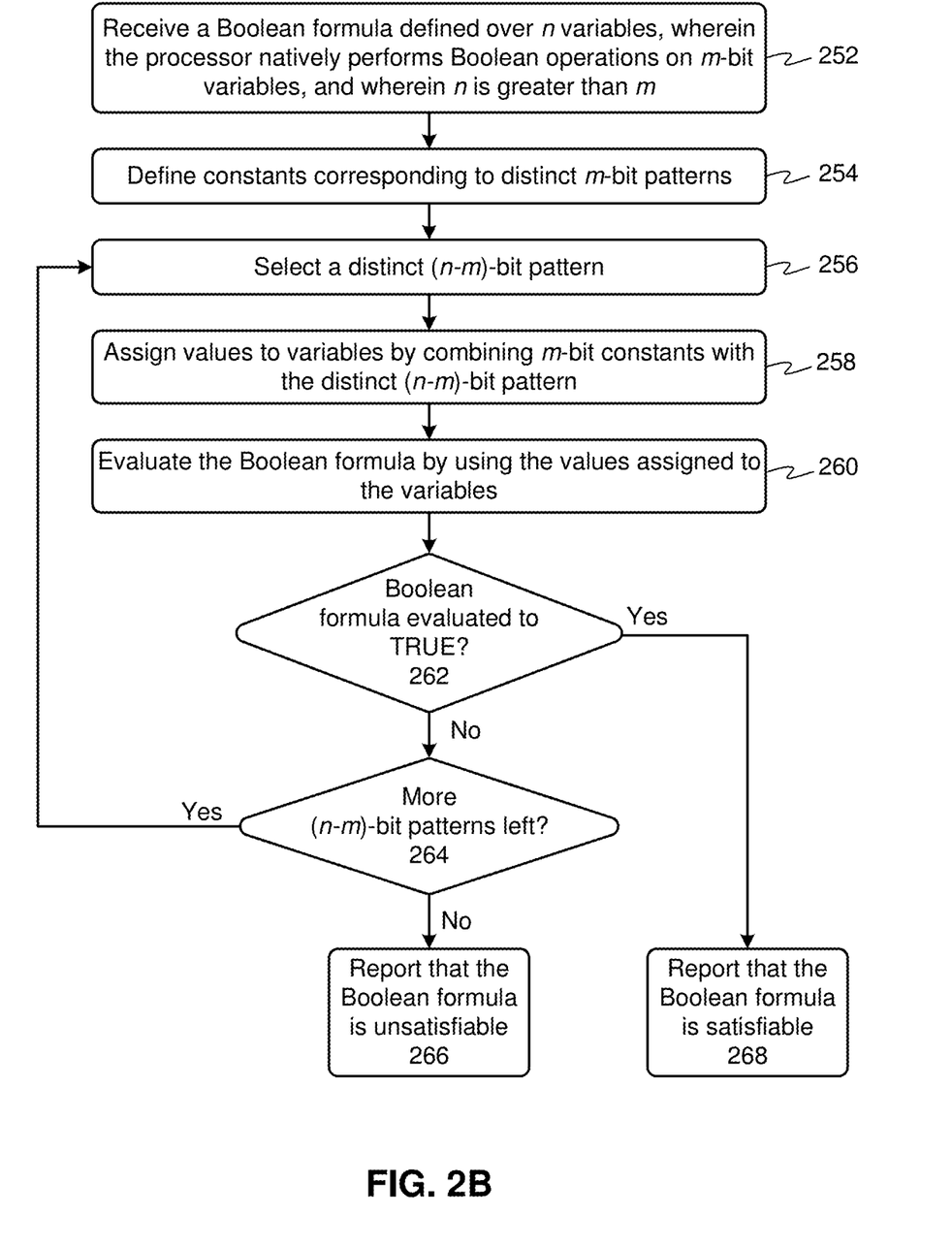
FIG. 2B illustrates a process for determining if a Boolean formula is satisfiable in accordance with some embodiments described herein.

FIG. 2B illustrates a process for determining if a Boolean formula is satisfiable in accordance with some embodiments described herein.

The process can begin by receiving a Boolean formula defined over n variables, wherein the processor natively performs Boolean operations on m-bit variables, and wherein n is greater than m (step 252). Next, the process can define constants corresponding to distinct m-bit patterns (step 254). The process can then iteratively perform a set of steps as explained below. In particular, the process can begin the iterative process by selecting a distinct (n-m)-bit pattern (step 256). Next, the process can assign values to variables by combining m-bit constants with the distinct (n-m)-bit pattern (step 258). The process can then evaluate the Boolean formula by using the values assigned to the variables (step 260).

Next, the process can check if the Boolean formula evaluated to TRUE (step 262). If the Boolean formula evaluated to TRUE, then the process can report that the Boolean formula is satisfiable (step 268). On the other hand, if the Boolean formula evaluated to FALSE, then the process can check if any more (n-m)-bit patterns are left to be processed (step 264). If more (n-m)-bit patterns are left, then the process can return to step 256 and select the next distinct (n-m)-bit pattern. On the other hand, if no more (n-m)-bit patterns are left, then the process can report that the Boolean formula is unsatisfiable (step 266).

Truth-Table Based SAT Solver

Some SAT solvers work on a conjunction of clauses, each clause being a disjunction of terms, and each term being a variable or the negation of the variable. Further details on such SAT solvers can be found in C. P. Gomes, H. Kautz, A. Sabharwal and B. Selman, "Satisfiability Solvers," in *Handbook of Knowledge Representation*, San Diego, USA, Elsevier Science, 2007, pp. 89-134, which is herein incorporated by reference in its entirety to provide implementation details of SAT solvers.

Some embodiments described herein provide an alternative approach to such SAT solvers. Specifically, instead of clauses, the truth tables built using Boolean interpretation as described above, are used. Any Boolean function $f(x_1, \ldots, x_s)$ given by a Boolean formula may be represented as a superposition of Boolean functions of a fixed number n of arguments: $f=g(h_1, \ldots, h_n)$, where $h_i$, i=1, . . . , n, are either variables from $(x_1, \ldots, x_s)$, or other Boolean functions, which can be recursively represented in the same form. This representation can be built by the syntactic structure of the formula. For example, if $f$=a &~(b|c|(~d^e) & c & a)|d, and n=3, function $f$ may be written as g(a, h, d)=a & h|d, h=~(b|c|u), u=v & a, v=(~d^e) & c (note that u is a function of only two arguments, but a function of two arguments is also a function of three arguments with the dummy third argument.)

Any Boolean function of n arguments may be represented as a truth table. If n is small enough (e.g., n≤9), the truth table may be built using Boolean interpretation as described above. This representation is compact, as it does not require storing the truth tables of intermediate functions participating in the computation of the truth table. Specifically, as mentioned above, to store a truth table for a function of 9 variables only 64 bytes are required. Along with the truth table, it is required to store the ordered mapping of its variables (e.g., $x_1, \ldots, x_n$) into global variable IDs. This mapping may also be made very compact; it is sufficient to store a fixed length array $(id(x_1), \ldots, id(x_n))$. The mapping from an argument index to its ID requires just an array indexing. The opposite mapping from a variable ID to the argument index requires, in the worst case, a linear search in this array. Because this array is small, the linear search is fast, faster than when using any dedicated data structure for a map, such as a hash table.

Thus, for the above example, global variables are indexed as follows: "0: a, 1: b, 2: c, 3: d, 4: e, 5: g, 6: h, 7: u, 8: v." Now, the truth table for g has the mapping (0, 7, 4), which means that its first argument is variable "a" (which has the global ID 0), its second argument is variable "h" (which has the global ID 7) and its third argument is variable "d" (which has the global ID 4).

In these embodiments, building truth tables for parts of function $f$ can be done once during preprocessing stage. Note that the truth table-based representation of a Boolean function allows efficient support for all these operations.

The main operations required by the SAT solvers that use clause-based representations are: (1) assigning a value to a variable, (2) Boolean constant propagation, and (3) constraint learning as the result of the conflict analysis. The following paragraphs explain how each of these operations and other operations that are used in SAT solvers can be performed more efficiently by using embodiments described herein that use truth-tables.

Assigning a Value to a Variable

Each variable, either a leaf or a truth table may be associated with a Boolean value as a result of constant propagation or during an attempt to set a value for this variable. A variable is said to have a value if there is a Boolean value associated with it. Specifically, the following process can be used to assign a value to a variable: (1) if the variable already has the same value, do nothing, (2) if the variable already has an opposite value, report a conflict, (3) map the variable to the value, (4) if this variable corresponds to a truth table, infer values of the variables belonging to this table support, and (5) propagate the variable value to other truth tables. Note that the value inference and propagation may be done in any order.

Logic Inference

When a truth table value is forced to constant value, embodiments described herein can infer implied assignments of its variables. For example, when a & b|c=0, c must be 0. Let x be the pattern of the variable v as explained above in reference to the section titled "Boolean Interpretation." Some embodiments described herein can perform logic inference by performing the following operations for each variable v in the support of this truth table $f$ (note that $f$ designates the current table that is going to be forced to be a constant). (1) If $f$ is being forced to 0, then (1a) if all bits of x corresponding to the zero bits off are zero, assign 0 to v, otherwise, (1b) if all bits of x corresponding to the zero bits off are units, assign 1 to v. (2) If $f$ is being forced to 1, then (2a) if all bits of x corresponding to the unit bits off are zero, assign 0 to v, otherwise, (2b) if all bits of x corresponding to the unit bits off are units, assign 1 to v.

Boolean Constant Propagation

When a constant value is assigned to some variable (or a truth table), update other truth tables depending on this variable as follows. In all truth tables depending on the given variable, substitute the variable value to the constant and compute the restricted value of the truth table. If it is a constant, assign this constant to the variable representing the truth table. There is no need in the logic inference for this table.

Computation of the Restricted Truth Table

The restricted truth table can be computed as follows. The process can check if the truth table has a constant value of 0 or 1. The process can assign mask=0. Next, for each variable v in the support of the truth table $f$, the process can perform the following operations: (1) if v is assigned a value 0, assign mask=mask|x; (2) if v is assigned a value 1 assign mask=mask|~x; (3) otherwise, go to the next variable. Recall that x is a bit pattern corresponding to variable v. After these operations are over, (1) if $f$ & mask=0 then $f$ has a constant value 0; (2) if ~$f$ & mask=0 then $f$ has a constant value 1; and (3) otherwise $f$ does not have a constant value.

Note that the constraint learning operation that is performed in conventional SAT solvers is reduced to adding new truth table(s) corresponding to the learned constraint(s) in embodiments described herein.

FIGS. 3A-3D illustrate a truth-table bases SAT solving process in accordance with some embodiments described herein. The object-oriented pseudocode shown in these figures has a C++-like syntax that is extended with various iteration constructs.

Figure 3A:
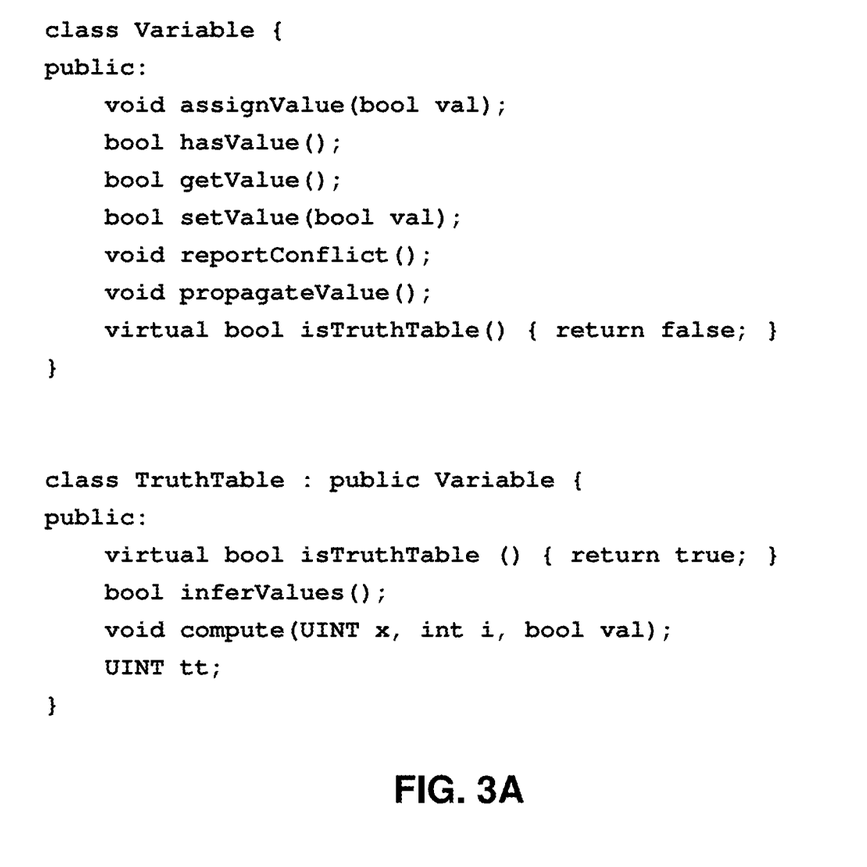
FIGS. 3A-3D illustrate a truth-table bases SAT solving process in accordance with some embodiments described herein.

In FIG. 3A, two classes are defined: Variable and TruthTable. Class Variable corresponds to one Boolean variable, either leaf or non-leaf. Class TruthTable corresponds to a non-leaf variable, i.e., to a Boolean subfunction represented as a truth table. As explained above, a truth table is built on top of n variables $x_1, \ldots, x_n$, given by their patterns, and has a mapping to global variable IDs.

In FIG. 3A, the method "hasValue( )" returns TRUE if the variable has been assigned a value (0 or 1), otherwise it returns FALSE. The method "getValue( )" returns the Boolean value assigned to the variable (assuming a value has been assigned). The method "setValue(bool val)" sets the variable to Boolean value "val." The method "reportConflict( )" reports an attempt to assign a conflicting value to a variable. The method "propagateValue( )" propagates values, and the method "isTruthTable( )" returns FALSE because this is a method within the Variable class.

The class TruthTable inherits from class Variable. The method "isTruthTable( )" returns TRUE because this is a method within the TruthTable class. The method "inferValues( )" implements value inference, the method "compute" computes the truth table and the variable "tt" contains the truth table in the form of an unsigned integer (e.g., a 512-bit value) as explained above in reference to "Boolean interpretation."

Figure 3B:
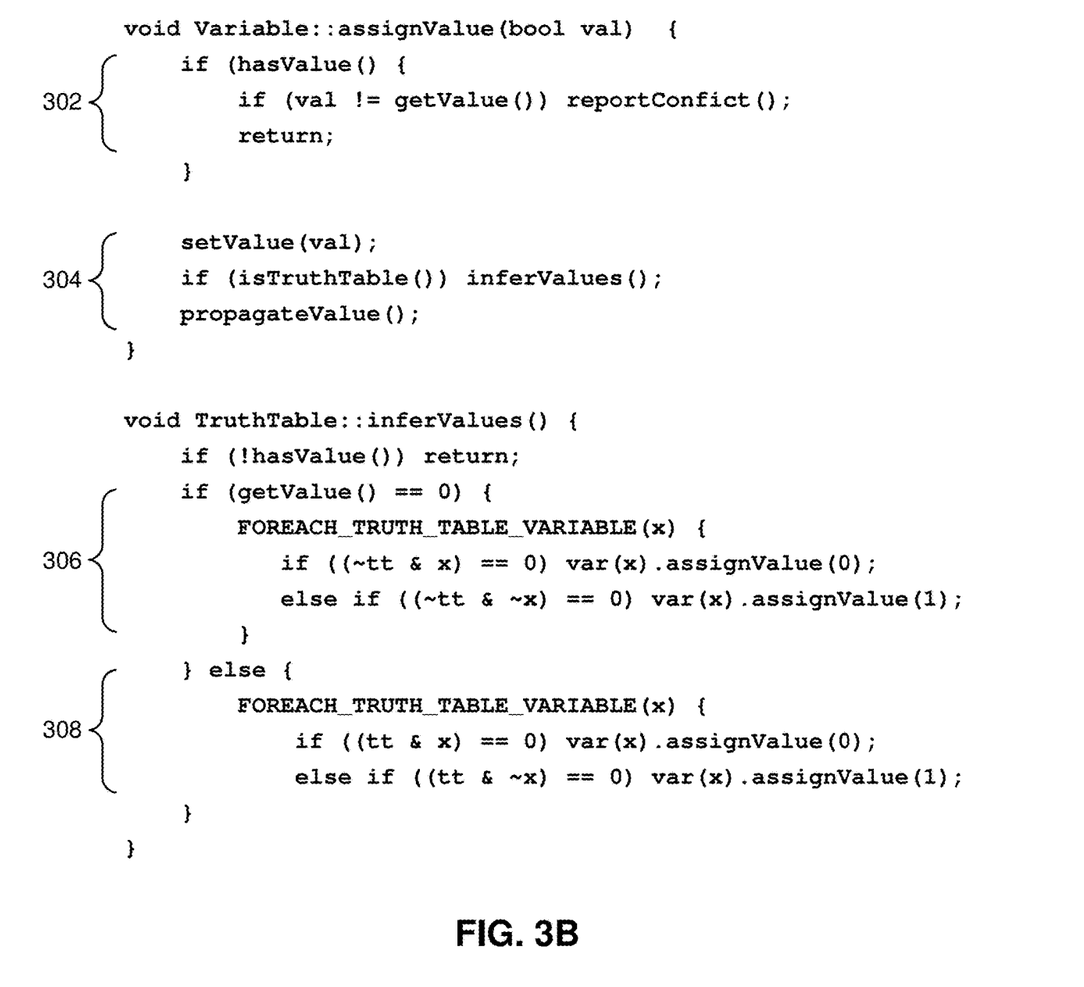

FIG. 3B illustrates details of methods "assignValue" and "inferValues." Method "assignValue" assigns the Boolean value "val" to the variable object. Specifically, the method "hasValue( )" is used to check if a value has already been assigned, and if a conflict is detected, then the "reportConflict( )" method is called (lines 302). On the other hand, if "hasValue( )" returns FALSE, then in lines 304, the process performs the following operations: (1) the value passed as an argument to the method call is assigned to the variable by using the "setValue( )" method, (2) if the current object is a TruthTable object, then the "inferValues( )" method is called, and (3) the "assignValue" method calls the "propagateValue" method to propagate the Boolean value that was just assigned to this variable.

Figure 3C:
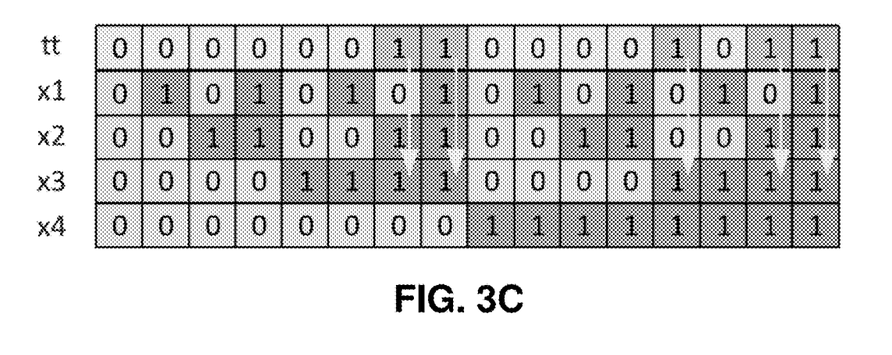

The "inferValues" method is used to infer values of the truth table variables when the truth table is assigned a value. If no value has been assigned to this object, then the method returns because there is nothing to infer. If a value has been assigned to the variable, then the method iterates over all argument patterns, and the value is inferred as 0 or 1 depending on the result of the conditional statement. Lines 306 are executed if the value 0 has been assigned to the variable, and lines 308 are executed if the value 1 has been assigned to the variable. In the pseudocode, the term "var (x)" refers to a variable whose pattern in this truth table is x. FIG. 3C illustrates an example of value inference. In FIG. 3C, when the truth table value "tt" is forced to 1, the variable "x3" is also forced to 1 as shown by the arrows in FIG. 3C.

Figure 3D:
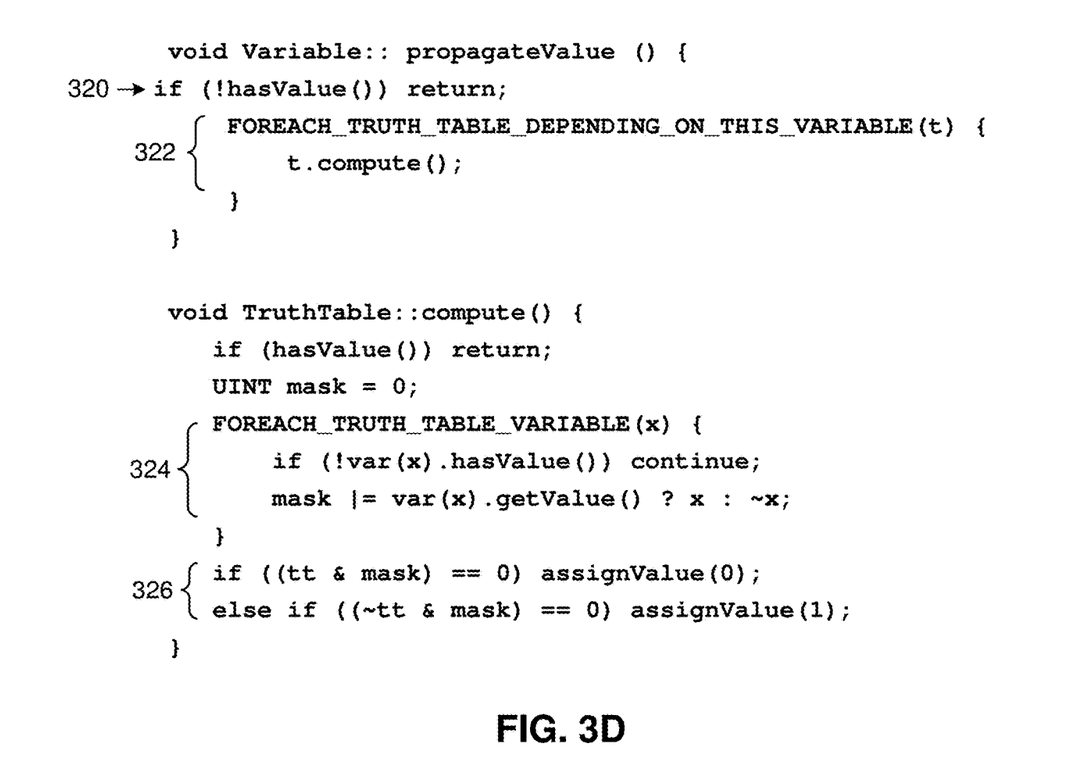

FIG. 3D illustrates details of class methods "propagateValue" and "compute." The method "propagateValue" performs constant when assigning a value to a variable by substituting the corresponding value in each truth table which depends explicitly on this variable. If the Variable object has not been assigned a value, then the method returns because there is nothing to propagate (line 320). Otherwise, for each truth table that depends on the variable corresponding to the current Variable object, the method calls the "compute" method of the truth table (line 322). The "compute" method computes the value of the truth table by taking into account the assigned values of its variables. A mask is created based on the truth table variables (lines 324). Next, the mask is used to assign a "0" value if all bits corresponding to assigned variables are 0, and a "1" value if all bits corresponding to assigned variables are 1 (lines 326).

The above pseudocode fixes an order of variable assignments and propagation. Other embodiments do not have to use to this order but may collect all required value propagation cases and perform them in any order based on the efficiency considerations.

Figure 3E:
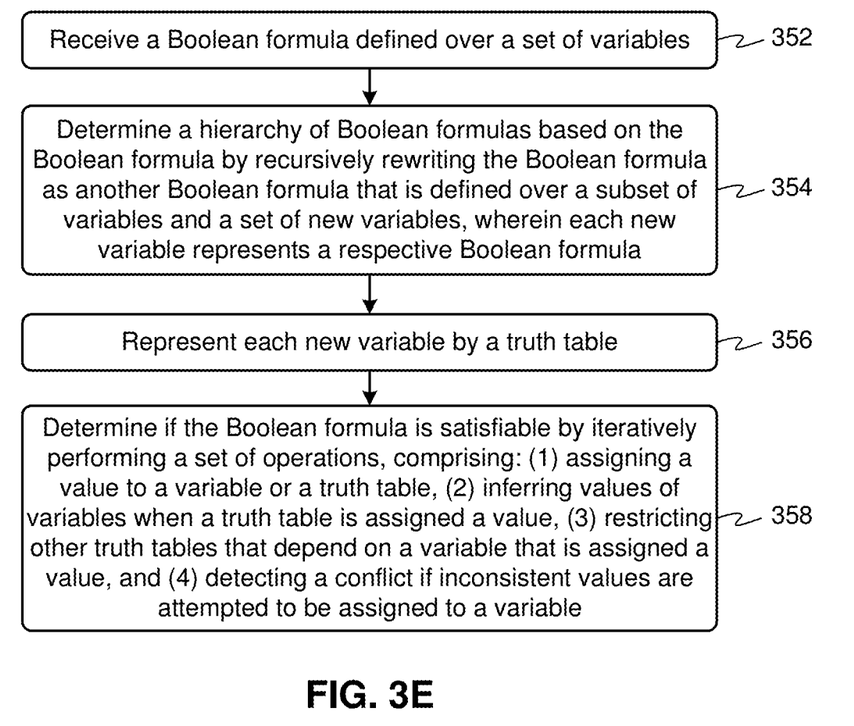
FIG. 3E illustrates a process for determining if a Boolean formula is satisfiable in accordance with some embodiments described herein.

FIG. 3E illustrates a process for determining if a Boolean formula is satisfiable in accordance with some embodiments described herein.

The process can begin by receiving a Boolean formula defined over a set of variables (step 352). Next, the process can determine a hierarchy of Boolean formulas based on the Boolean formula by recursively rewriting the Boolean formula as another Boolean formula that is defined over a subset of variables and a set of new variables, wherein each new variable represents a respective Boolean formula (step 354). For example, as explained above, the Boolean formula $f$=a &~(b|c|(~d^e) & c & a)|d, can be written as g(a, h, d)=a & h|d, h=~(b|c|u), u=v & a, v=(~d^e) & c. In this example, the formula "g(a, h, d)" is at the highest level in the hierarchy (e.g., level=0; note that the level number increases as we go down in the hierarchy), the formula h=~(b|c|u) is at the next lower level (e.g., level=1), the formula u=v & a is at the next lower level (e.g., level=2), and formula v=(~d^e) & c is at the lowest hierarchy level (e.g., level=3).

Next, the process can represent each new variable by a truth table (step 356). The process can then determine if the Boolean formula is satisfiable by iteratively performing a set of operations, comprising: (1) assigning a value to a variable or a truth table, (2) inferring values of variables when a truth table is assigned a value, (3) restricting other truth tables that depend on a variable that is assigned a value, and (4) detecting a conflict if inconsistent values are attempted to be assigned to a variable (step 358). Note that, restricting a truth table involves ruling out certain values in the truth table based on a variable assignment (the step of restricting a truth table is explained further in the section titled "Computation of the restricted truth table").

Specifically, the process can use the techniques illustrated in reference to FIGS. 3A-3D to assign, infer, update, and detect conflicts. The Boolean formula can be determined to be satisfiable if while iteratively performing the set of operations, the process is able to assign values to all variables without conflict that causes the Boolean formula to evaluate to a TRUE value. On the other hand, the Boolean formula can be determined to be unsatisfiable if the set of operations that are performed iteratively terminates, and the process is unable to assign values to all variables without conflict that causes the Boolean formula to evaluate to a TRUE value.

Some existing SAT solvers search the solution space by assigning values to variables, inferring and/or propagating the assigned values throughout the set of Boolean formulas, and backtracking when conflicts are detected. For example, M. Davis, G. Logemann and D. Loveland, "A Machine Program for Theorem-Proving", Communications of ACM, Vol. 5, No. 7, pp. 394-397, 1962 describes a framework that searches the solution space by guessing variable values and detecting conflicts, and is herein incorporated by reference in its entirety for all purposes. Step 358 in FIG. 3E uses a similar process to search the solution space, but is significantly more efficient than existing techniques that are based on such approaches because the process illustrated in FIG. 3E uses truth tables. (Note that, in the SAT literature, the assignment of a value to a variable is sometimes referred to a "decision" because when we assign a value to a variable, we "decide" that the variable is to be assigned a particular value.)

Embodiments described herein that use a truth table based SAT solver have multiple advantages over conventional CNF-based SAT solvers. These advantages include, but are not limited to: (1) the data model of a table based SAT solver is more compact, (2) the basic operations on truth tables are faster, and (3) truth table based inference is more aggressive.

Some embodiments implement a truth table-based SAT solver described in the previous section in hardware modules. All basic operations described in the previous sections can be implemented in hardware modules. In addition, hardware implementation allows a parallel analysis of the truth tables. Further details on how SAT solvers can be implemented in hardware can be found in A. A. Sohanghpurwala, M. W. Hassan, and P. Athanas, "Hardware accelerated SAT solvers—A survey," Journal of Parallel and Distributed Computing, vol. 106, pp. 170-184, 2017, which is herein incorporated by reference in its entirety for all purposes.

Figure 4:
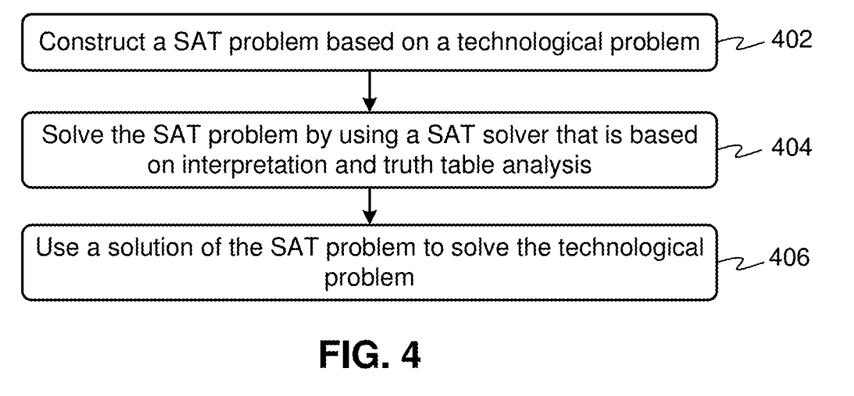
FIG. 4 illustrates a process for solving a technological problem by using a SAT solver in accordance with some embodiments described herein.

FIG. 4 illustrates a process for solving a technological problem by using a SAT solver in accordance with some embodiments described herein. The process can begin by constructing a SAT problem based on a technological problem (step 402). Next, the process can solve the SAT problem by using a SAT solver that is based on interpretation and truth table analysis (step 404), as explained in reference to FIGS. 1A-3E. The process can then use the solution of the SAT problem to solve the technological problem (step 406).

Specifically, when the SAT problem is constructed from a technological problem, it explicitly or implicitly maps variables in the technological problem to variables in the SAT problem. Once a solution to the SAT problem has been found, a reverse mapping can be used to convert the SAT solution into a solution for the technological problem. Techniques for constructing SAT problems from technological problems (i.e., step 402), and for converting solutions of the SAT problems into solutions of the technological problems (i.e., step 406) are well-known in the art, e.g., see Jodo P. Marques-Silva, "Practical applications of Boolean satisfiability," Proceedings of the 9th International Workshop on Discrete Event Systems, 2008.

In particular, an IC design and manufacturing process includes multiple technological problems that can be solved by using a SAT solver. For example, the process can begin by constructing a SAT problem based on an IC design verification problem. The process can then solve the SAT problem by using techniques described in this disclosure. Next, the process can use the solution of the SAT problem to solve the IC design verification problem. Upon successfully verifying the IC design, the process can then perform subsequent steps in an IC design and manufacturing process that results in IC chips.

Figure 5:
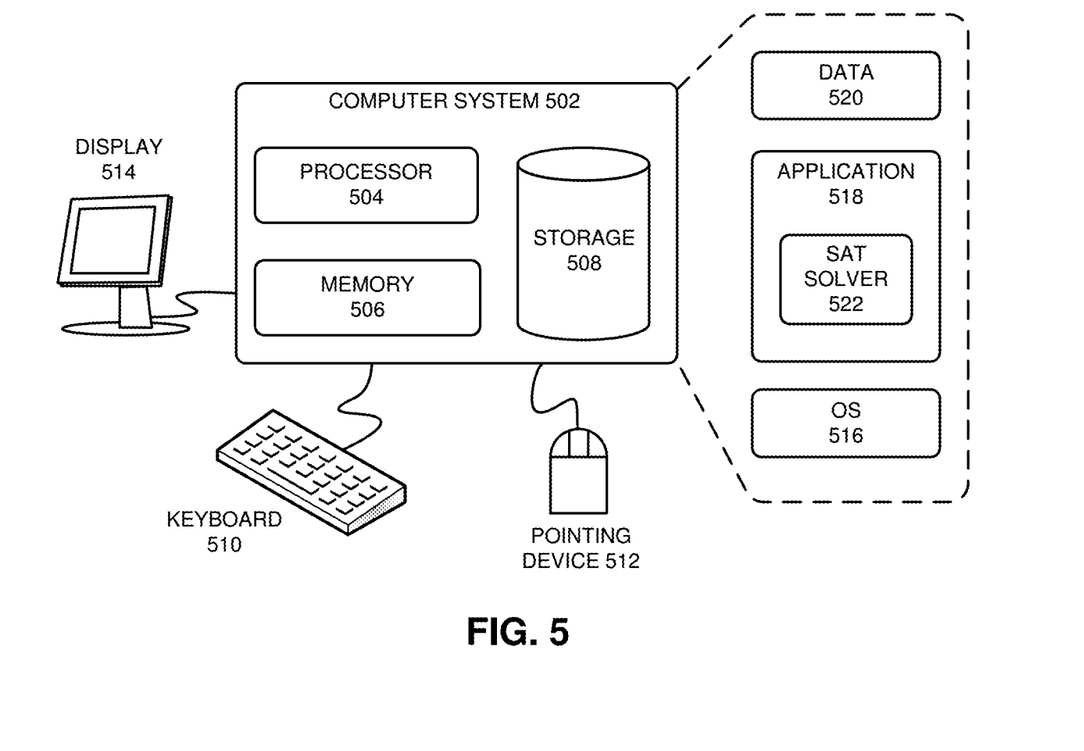
FIG. 5 illustrates a computer system in accordance with some embodiments described herein.

FIG. 5 illustrates a computer system in accordance with some embodiments described herein. Computer system 502 can include processor 504, memory 506, and storage device 508. Specifically, memory locations in memory 506 are addressable by processor 504, thereby enabling processor 504 to access (e.g., via load/store instructions) and manipulate (e.g., via logical/floating point/arithmetic instructions) the data stored in memory 506. Computer system 502 can be coupled to display device 514, keyboard 510, and pointing device 512. Storage device 505 can store operating system 516, application 518, which includes SAT solver 522, and data 520. Data 520 can include input required by application 518 and/or output generated by application 518.

Computer system 502 may automatically (or with user help) perform one or more operations that are implicitly or explicitly described in this disclosure. Specifically, computer system 502 can load application 518 into memory 506, and application 518 can then be used to solve a technological problem, which involves solving a SAT problem using SAT solver 522 (which implements techniques and systems described in this disclosure). As explained above, embodiments described herein can substantially improve the performance of a SAT solver which, in turn, substantially improves the performance of the application that is being used to solve the technological problem.

While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about at the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more ('ensemble') electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a wire with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information that typically is limited in size and/or complexity. For example, the term 'module' can signify one or more processes that transforms data and information, for example, processes comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU'; an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('API') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3DNRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

The signifier 'commercial solution' signifies, solely for the following paragraph, an engineering domain-specific (and thus non-preemptive—see Bilski): electronic structure, a process for a specified machine, a manufacturable circuit (and their Church-Turing equivalents) or a composition of matter that applies science and/or technology in commerce to solve a technical problem.

The signifier 'abstract' (when used in a patent claim for any enabled embodiments disclosed herein for a new commercial solution that is a scientific use of one or more laws of nature {see Benson}, and that solves a problem of technology {see Diehr} used in commerce—or improves upon an existing commercial solution {see Diehr})—is precisely defined by the inventor(s) {see MPEP 2111.01 (9th edition, Rev. 08.2017)} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art publications that can be combined {see Alice} by a skilled person {often referred to as a 'PHOSITA', see MPEP 2141-2144 (9th edition, Rev. 08.2017)} to be equivalent to the new commercial solution, and is thus unpatentable under 35 U.S.C. 103, for example, because it is 'difficult to understand' how the new commercial solution differs from a PHOSITA-combination/-application of the existing prior art; or c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated By Reference in this patent application are specifically Incorporated By Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the Claims.

The foregoing embodiments have been presented for purposes of illustration and description. They are not intended to be exhaustive or to limit the scope of this disclosure to the forms disclosed. Accordingly, many modifications and variations will be apparent to practitioners skilled in the art. Additionally, the above disclosure is not intended to limit the disclosed subject matter. The scope of the claimed invention(s) is defined by the appended claims.

What is claimed is:

1. A non-transitory computer-readable storage medium storing instructions, which when executed by a processor, cause the processor to:
   receive a Boolean formula defined over n variables, wherein the processor performs Boolean operations on m-hit words, and wherein n is greater than m;
   determine a hierarchy of Boolean formulas based on the Boolean formula by recursively rewriting the Boolean formula as another Boolean formula that is defined over a subset of variables and a set of new variables, wherein each new variable represents a respective Boolean formula;
   represent each new variable by a truth table; and
   determine if the Boolean formula is satisfiable by iteratively performing a set of operations, comprising: (1) assigning a value to a variable or a truth table, (2) inferring values of variables when a truth table is assigned a value, (3) restricting other truth tables that depend on a variable that is assigned a value, and (4) detecting a conflict if inconsistent values are attempted to be assigned to a variable.

2. The non-transitory computer-readable storage medium of claim 1, wherein the instructions, which when executed by the processor, cause the processor to determine that the Boolean formula is satisfiable if said iteratively performing the set of operations is able to assign values to all variables without conflict that causes the Boolean formula to evaluate to a TRUE value.

3. The non-transitory computer-readable storage medium of claim 1, wherein the instructions, which when executed by the processor, cause the processor to that the Boolean formula is unsatisfiable if said iteratively performing the set of operations terminates without being able to assign values to all variables without conflict that causes the Boolean formula to evaluate to a TRUE value.

4. A method for determining if a Boolean formula is satisfiable, wherein the Boolean formula defined over a set of variables, the method comprising:
   receiving a Boolean formula defined over n variables;
   determining a hierarchy of Boolean formulas based on the Boolean formula by recursively rewriting the Boolean formula as another Boolean formula that is defined over a subset of variables and a set of new variables, wherein each new variable represents a respective Boolean formula;

representing each new variable by a truth table; and determining, by a processor that performs Boolean operations on m-bit words, wherein in is less than n, if the Boolean formula is satisfiable by iteratively performing a set of operations on a processor, the set of operations comprising: (1) assigning a value to a variable or a truth table, (2) inferring values of variables when a truth table is assigned a value, (3) restricting other truth tables that depend on a variable that is assigned a value, and (4) detecting a conflict if inconsistent values are attempted to be assigned to a variable.

5. The method of claim 4, wherein the method further comprises determining that the Boolean formula is satisfiable if said iteratively performing the set of operations is able to assign values to all variables without conflict that causes the Boolean formula to evaluate to a TRUE value.

6. The method of claim 4, wherein the method further comprises determining that the Boolean formula is unsatisfiable if said iteratively performing the set of operations terminates without being able to assign values to all variables without conflict that causes the Boolean formula to evaluate to a TRUE value.

7. A non-transitory computer-readable storage medium storing instructions, which when executed by a processor, cause the processor to:

define m-bit constants corresponding to distinct m-bit patterns, wherein the processor performs Boolean operations on m-bit words, wherein a Boolean formula is defined over n variables, and wherein n is greater than in; and iteratively perform a set of operations, comprising:
selecting a distinct (n-m)-bit pattern,
assigning values to variables by combining the m-bit constants with the distinct (n-m)-bit pattern,
evaluating the Boolean formula by using the values assigned to the variables, and
in response to determining that the Boolean formula evaluated to a TRUE value, determining that the Boolean formula is satisfiable.

8. The non-transitory computer-readable storage medium of claim 7, wherein the instructions, which when executed by the processor, cause the processor to determine that the Boolean formula is unsatisfiable if the Boolean formula did not evaluate to a TRUE value in any iteration during said iteratively performing the set of operations.

9. The non-transitory computer-readable storage medium of claim 7, wherein said iteratively performing the set of operations terminates when all possible (n-m)-bit patterns have been selected.

10. The non-transitory computer-readable storage medium of claim 7, wherein said assigning values to variables by combining the m-bit constants with the distinct (n-m)-bit pattern comprises concatenating each m-bit constant with the distinct (n-m)-bit pattern.

\* \* \* \* \*

UNITED STATES PATENT AND TRADEMARK OFFICE
CERTIFICATE OF CORRECTION

PATENT NO.         : 11,232,174 B1
APPLICATION NO.    : 16/568797
DATED              : January 25, 2022
INVENTOR(S)        : Korchemny Page 1 of 1

It is certified that error appears in the above-identified patent and that said Letters Patent is hereby corrected as shown below:

In the Claims

In Claim 1 (at Column 18, Line 31), please delete the word, "m-hit" and replace with -- m-bit --

In Claim 4 (at Column 19, Line 6), please delete the word, "in" and replace with -- $m$ --

In Claim 7 (at Column 20, Line 3), please delete the word, "in" and replace with -- $m$ --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*